United States Patent [19]
Snelling et al.

[11] Patent Number: 5,910,164
[45] Date of Patent: Jun. 8, 1999

[54] ICE CUBE DISPENSER FOR COMPRESSED FLAKED ICE CUBES

[75] Inventors: Jeff Snelling, Griffin; Russel Axel Borg, Jr., Peachtree City, both of Ga.

[73] Assignee: Hoshizaki America, Inc., Peachtree City, Ga.

[21] Appl. No.: 08/914,761

[22] Filed: Aug. 20, 1997

Related U.S. Application Data

[60] Provisional application No. 60/035,265, Dec. 12, 1996.
[51] Int. Cl.$^6$ ...................................................... F25C 5/18
[52] U.S. Cl. ........................... 62/344; 222/241; 366/325.4
[58] Field of Search ........................ 62/344; 222/185.1, 222/241; 366/325.4, 325.5

[56] References Cited

U.S. PATENT DOCUMENTS

| | | | |
|---|---|---|---|
| 377,443 | 2/1888 | Walden | 366/325.4 |
| 722,528 | 3/1903 | Miner et al. | 222/241 |
| 1,208,058 | 12/1916 | Warriner | 222/241 |
| 1,311,227 | 7/1919 | Hartman | 222/241 |
| 2,636,834 | 4/1953 | Myers | 366/325.5 |
| 3,067,591 | 12/1962 | Lingle | 62/344 |
| 3,136,452 | 6/1964 | Mihalek | 222/80 |
| 3,458,089 | 7/1969 | Maxson et al. | 222/231 |
| 3,592,444 | 7/1971 | Arvanitakis | 222/241 |
| 3,651,656 | 3/1972 | Esser et al. | 62/137 |
| 4,512,502 | 4/1985 | Landers | 222/413 |
| 4,771,609 | 9/1988 | Funabashi | 62/137 |
| 4,803,850 | 2/1989 | Josten et al. | 62/98 |
| 4,856,682 | 8/1989 | Miller et al. | 222/238 |
| 5,165,255 | 11/1992 | Alvarez et al. | 62/344 |
| 5,516,009 | 5/1996 | Kautz | 222/238 |
| 5,560,221 | 10/1996 | Snelling et al. | 62/344 |

*Primary Examiner*—William E. Tapolcai
*Attorney, Agent, or Firm*—Nikaido, Marmelstein, Murray & Oram LLP

[57] ABSTRACT

An ice cube dispenser for compressed ice flakes includes an ice cube source and an ice storage bin disposed adjacent the ice cube source. The ice storage bin has an arcuate bottom surface and at least two sides thereof. The arcuate contours are provided where the at least two sides join the arcuate bottom surface. An agitator is disposed within the ice storage bin wherein the agitator comprises a first ice agitator arm rotating on a shaft. The first ice agitator arm defines a radius when the shaft is rotated. The radius corresponds to a radius of the arcuate bottom surface and one of the arcuate contours of the ice storage bin. The first agitator arm has a shape which corresponds to a shape of the one of the arcuate contours between one of the at least two sides and the arcuate bottom surface.

13 Claims, 5 Drawing Sheets

ICE CUBE DISPENSER FOR COMPRESSED FLAKED ICE CUBES

This application claims the benefit of U.S. Provisional application Ser. No. 60/035,265, filed Dec. 12, 1996.

BACKGROUND OF THE INVENTION

The present invention is directed to an ice bin/agitator configuration for a ice dispensing apparatus wherein ice is provided to an ice bin and then dispensed from the ice bin into drinking glasses or ice buckets, and where ice can also be placed onto a cold plate for cooling beverages which are subsequently dispensed. In these types of devices, an ice bin is utilized to store ice provided from an ice making source, and some type of device must be employed in order to prevent the individual ice cubes or ice flakes from bridging or freezing into a single unmanageable block of ice, thereby rendering the machine unusable. Ice cubes formed from compressed flaked ice pose special problems since these types of ice cubes are softer and can be more readily broken by the agitator blades than clear, frozen ice cubes.

DESCRIPTION OF THE PRIOR ART

A number of systems have been known to provide ice in both cube form and in a flaked or shredded form. Typically, for use in beverage dispensers, it is most desirable to use frozen cubes of ice, since such frozen cubed ice will resist melting due to the fact that ice cubes have larger mass than ice shreds or ice flakes, thereby preventing dilution of the beverages, and that such cubed ice provide a more aesthetically pleasing appearance in translucent or transparent beverages. U.S. Pat. No. 5,560,221 discloses a configuration of a beverage dispensing apparatus which utilizes an ice bin and an agitator for dispensing ice cubes. FIG. 1 illustrates the configuration of this device, wherein a plurality of frozen ice cubes, from an ice cube machine M, provides a plurality of frozen ice cubes into bin 10. Agitator 11 includes rotating shaft 11a which is connected to motor 13, spiral or helical agitator blades 11b to agitate the ice, and ice movement blades 11c to lift and move the ice from the bin into an ice dispensing port (not shown). Because ice maker M freezes ice cubes, the ice cubes are fairly rigid and retain their form when falling from ice maker M into the bottom of ice bin 10. The configuration of FIG. 1 encounters difficulty when encountering compressed flaked ice, however, because the configuration of agitator 11 would not enable flaked ice or compressed ice cubes to be properly moved, due to the softer nature of the ice cubes. Freezing or bridging could occur in the bin, thereby disabling the dispenser.

Compressed flaked ice can be made, for example, by what is known as a flaker machine, wherein flakes of ice are scraped from an ice making surface by a helical auger or scraper and driven upward or downward through a rotation of the helical auger. An example of such a flaker machine is disclosed in U.S. Pat. No. 5,109,679, which is hereby incorporated by reference. At the top or bottom of a cylinder in which the auger rotates is an ice forming mold which compresses the ice flakes into the form of an ice cube, thereby forming compressed flaked ice. Because this ice is compressed into this shape rather than frozen in this shape, these compressed flaked ice cubes are softer than typical frozen ice cubes, and are not transparent. However, it is sometimes faster and cheaper to form these compressed flaked ice cubes rather than frozen solid ice cubes, thereby making it desirable to develop an ice dispensing apparatus which can dispense compressed flaked ice into a cup or receptacle in a reliable manner. One problem which is created by the configuration illustrated in FIG. 1 is that if compressed flaked ice cubes are placed in bin 10, agitation of agitator 11 could result in broken portions of the compressed flaked ice cubes remaining on the sides, on the bottom, and in the corners of bin 11.

The present invention is directed to a bin and agitator configuration wherein compressed flaked ice cubes can be provided into an ice bin by a compressed flaked ice generating machine, and whereby the compressed flaked ice cubes, and residual portions thereof, can be effectively and reliably dispensed from the bin while eliminating the risk of a bridging effect; that is, the ice cubes and ice particles are effectively moved from the sides of the ice bin by the agitator and directed to an ice dispensing blade in such a manner that the ice particles are prevented from freezing or bridging into a large unmanageable block of ice.

DETAILED DESCRIPTION OF THE PREFERRED EMBODIMENTS

Figure 1:
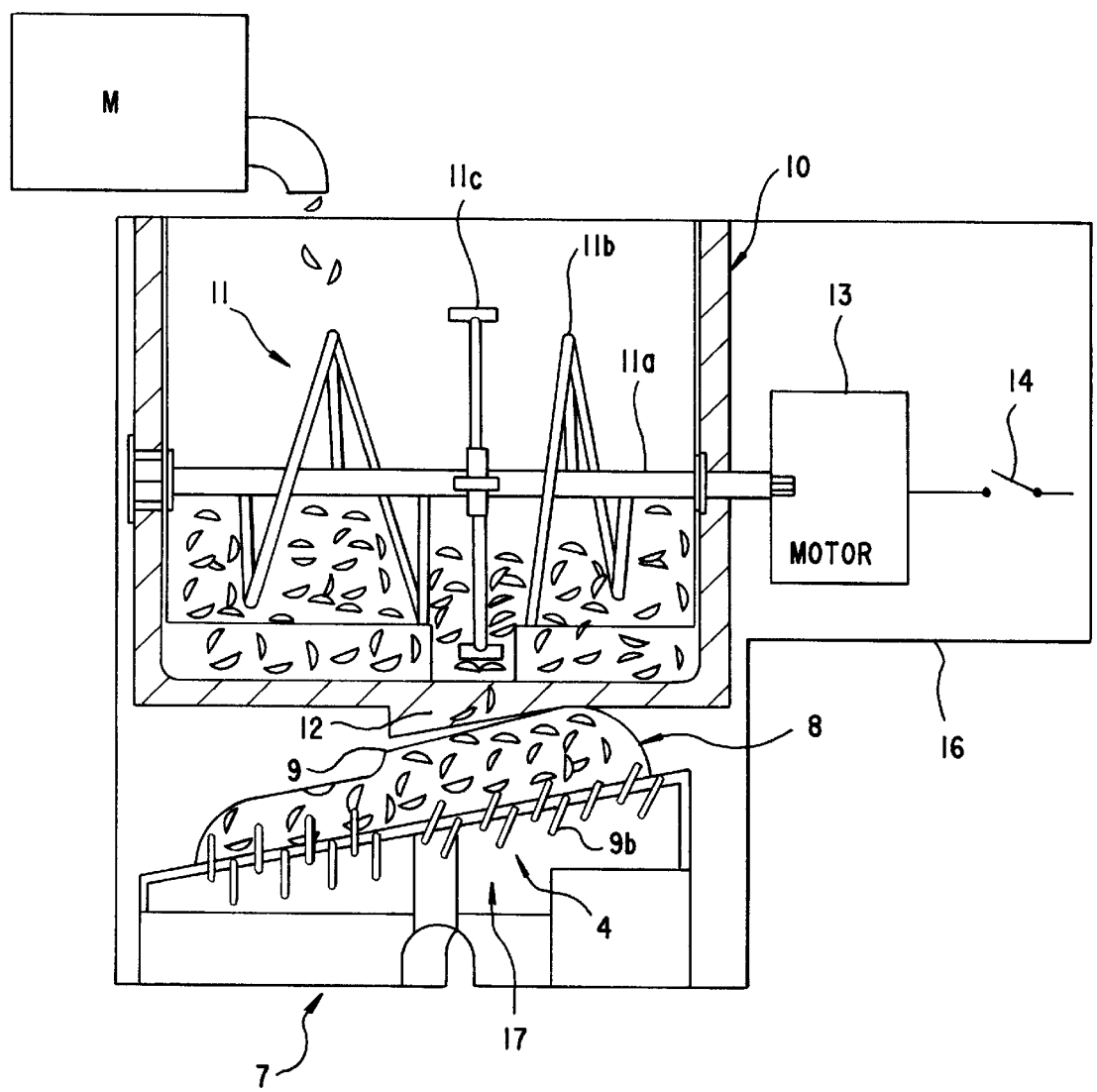
FIG. 1 illustrates a prior art ice dispensing/beverage cooling apparatus.

Referring to FIGS. 2–5, a configuration of an ice bin/agitator configuration is shown which can enable effective dispensation of compressed flaked ice from compressed flaked ice source F in such a manner which avoids a bridging or freezing effect. For simplicity, reference numbers of elements which could be identical to the prior art elements of FIG. 1 are used throughout the application.

Figure 2:
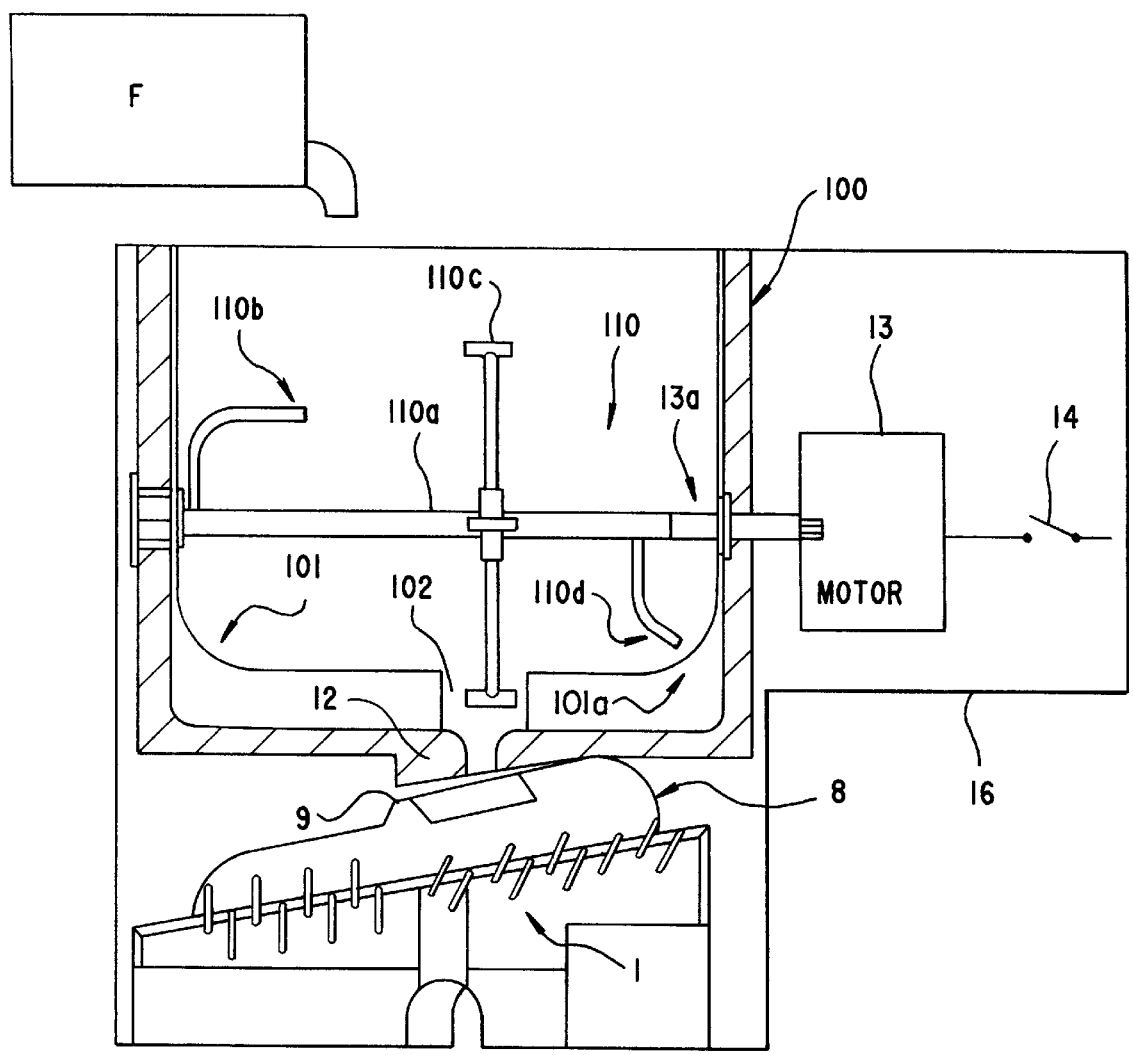
FIG. 2 illustrates an ice dispensing/beverage cooling apparatus employing an agitator and ice bin according to the present invention.

FIG. 2 illustrates ice bin 100 having agitator 110 disposed therein. Agitator 110 is agitated by motor 13, which is controlled by on/off switch 14. A lower portion of ice bin 10 includes opening 12 therein, which feeds ice onto ice guide 9 and into chute 12, and onto a surface of cold plate 1. The cold plate, the chute, the ice bin, the motor, and the switch can be contained within a housing 16. As shown in FIG. 2, the corners 101 and 101a of ice bin 100 are rounded; agitator 110 includes a first agitator portion 110b, disposed at a distal end of agitator shaft 110a, and having a shape which essentially corresponds to a radius of the curvature of inner corner 101. During a rotation of agitator shaft 110a, agitator arm 110b sweeps the corner portion 101 of the ice bin, thereby ensuring that any ice particles are effectively moved toward ice movement blades 110c of agitator 110. It is desirable that agitator arm 110b have a small clearance between an outer surface thereof and an inner surface of corner 101 of ice bin 100. Experimentation has proven that a maximum clearance of 10 mm is desirable.

Figure 3:
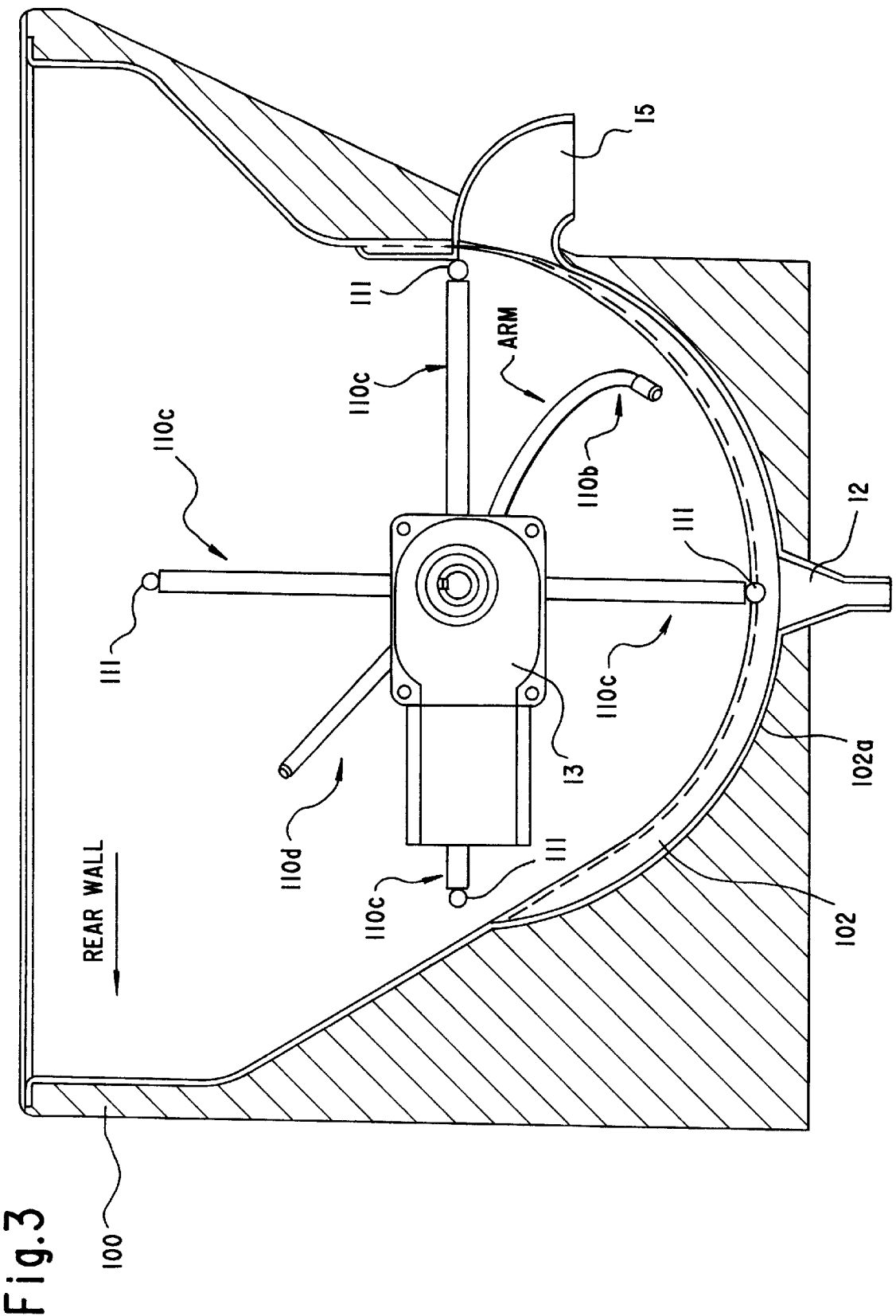
FIG. 3 shows a side view of an ice bin and agitator according to the present invention.
Figure 4:
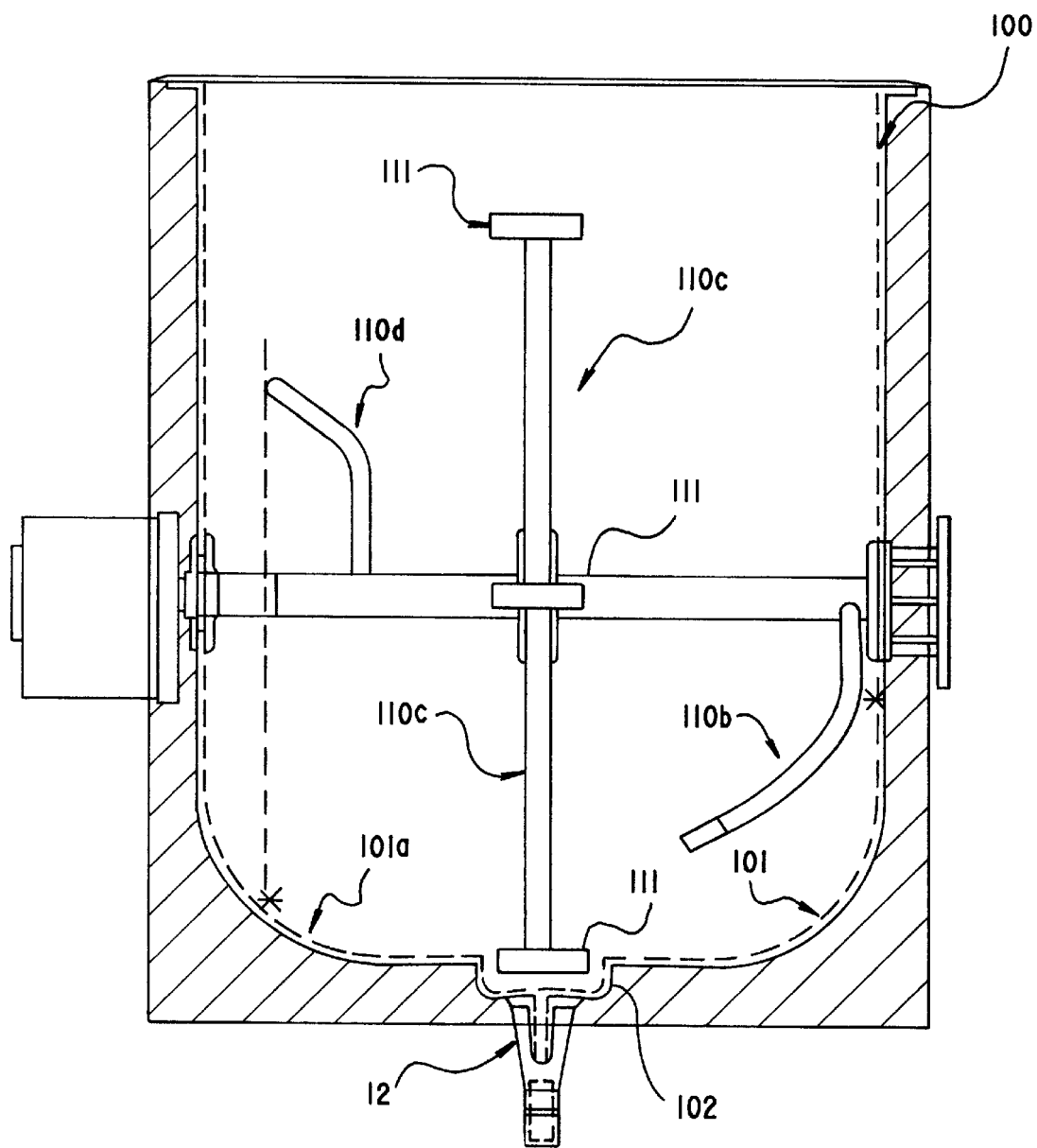
FIG. 4 shows a cross section of an ice bin and agitator assembly according to the present invention.
Figure 5:
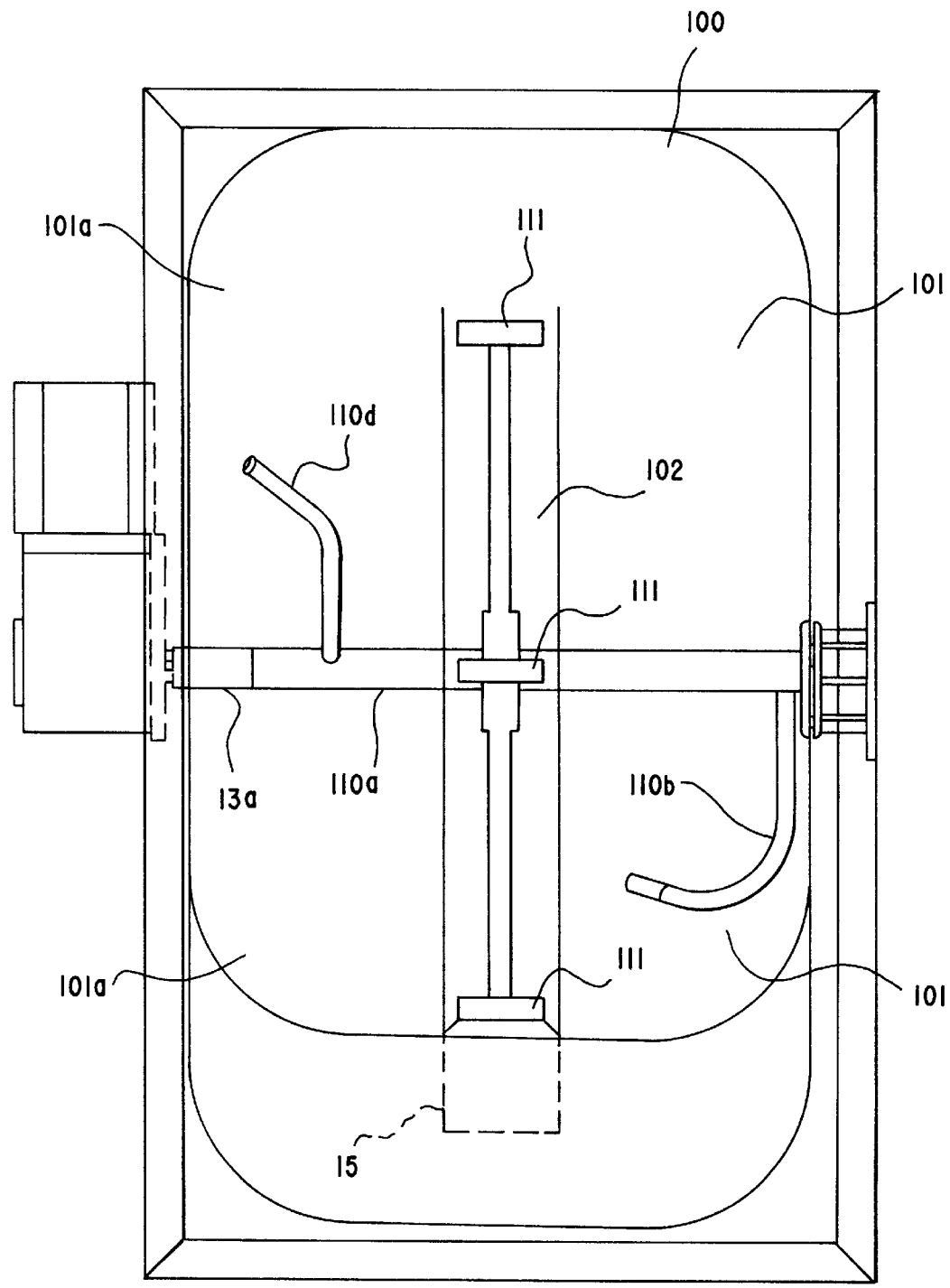
FIG. 5 illustrates a top view of an ice bin and ice agitator according to the present invention.

Referring to FIG. 3, a side view of bin 100 is shown. The cross section of bin 100 is configured such that a circular radius is provided at a bottom portion thereof, with the circular radius essentially corresponding to the radial path which is followed by arm 110b, and arm 110d as will be discussed below. Referring back to FIG. 2, it can be seen that motor shaft 13*a* protrudes into bin 100 through a side wall thereof. This protrusion is necessary in order to enable effective and efficient installation of agitator 110 within bin 100, and effective coupling of motor shaft 13*a* to agitator shaft 110*a*. Because of this protrusion, it is not possible to have a radially corresponding agitator arm comparable to arm 110*b* on a motor-side of agitator shaft 110*a*. Therefore, the motor-side of shaft 110*a* has agitator arm 110*d* attached thereto, as shown in FIGS. 2–4. Agitator shaft 110*b*, due to the configuration of motor shaft 13*a*, is offset by a predetermined distance from a side wall of bin 100. In order to ensure that ice is effectively moved from motor-side corner 101*a* of bin 100, agitator arm 110*d* protrudes essentially perpendicularly from shaft 110*a*, and is then bent outwardly into the corner 101*a*. Clearance between the distal end of arm 110*b* and corner 101*a* is preferably less than 10 mm, to ensure proper agitation of ice particles. It should be noted that FIG. 2 illustrates a configuration wherein motor 13 is on the right hand side of bin 100, while FIGS. 3–5 illustrate a configuration wherein motor 13 is disposed on a left hand side. The actual side on which the motor is disposed is not critical, as long as the motor-side agitator arm 110*d* is disposed to effectively scrape ice from the corner as shown, and the agitator 110*b* is effectively curved in a manner which corresponds to the radial shape of the corner of the ice bin. The purpose of agitator arms 110*b* and 110*d* are for the purpose of ensuring that ice does not attach to the side walls of bin 100, and for guiding ice particles toward ice movement blades 110*c*. As noted earlier, ice movement blades 110*c* acts to move ice to a desired location, either through ice dispenser port 15 and/or opening 12. In the configuration shown in FIG. 3, opening 12 is formed merely as a drain to drain water therefrom. In FIG. 1, opening 12 is configured to enable ice particles to fall onto the surface of cold plate 1, thereby cooling beverages therebetween.

In order to effectively ensure that ice particles are moved to ice dispenser 15, bin 100 includes a slot 102 in which distal portions of ice movement blades 110*c* can travel. Distal portions of ice movement blades 110*c* can include T-sections 111 thereupon, to effectively move ice through slot 102 and scoop ice upward through ice dispensing port 15.

Referring to FIG. 5, illustrating an overhead view of ice bin 100 with motor 13 on the left side thereof, it can be seen that the ice bin includes rounded corners at all sections adjacent the agitator arms, to minimize the likelihood that ice will be stuck in the corners. In other words, there are two rounded corner 101 has a radial contour which follows the radial path of arm 110*b*, and two corner 101*a* has a radial counter which is swept by radial movement of agitator arm 110*d*.

FIG. 3 illustrates bottom surface 102*a* of slot 102; this bottom surface is configured with T-section 111 of agitator arms 110*c* to have a maximum clearance of 10 mm therebetween. As discussed above, this maximum clearance will enable maximum movement of ice cubes and ice particles from the slot through the desired dispenser 15. Clearance between agitator arm 110*b* and bin corner 101 does not exceed 10 mm, and similarly, clearance between a distal end of agitator arm 110*d* and corner 101*a* does not exceed 10 mm.

The above-discussed description of the invention illustrates an embodiment wherein a motor for the agitator arm can be disposed on a left or a right side of the agitator bin. As long as the relative agitator arms 110*b* and 110*d* are configured relative to the motor as shown in FIGS. 2 and 4, appropriate ice movement and bridging prevention can occur. Furthermore, FIG. 2 illustrates a configuration of the invention wherein ice is moved by ice dispenser blades 110*c* towards opening 12 so that the ice can be moved onto a secondary location such as a surface of cold plate 1. As shown in the configuration of FIG. 3, however, opening 12 can merely be used as a water drain to drain water resulting from ice melting therethrough. This configuration, therefore, would result in ice only being moved by ice movement blades 110*c* through ice dispensing port 15.

This embodiment of the invention discloses the best mode of the invention which is envisioned by the inventors. However, another embodiment of the invention could be one where motor shaft 13 does not project into ice bin 100, and instead agitator shaft 110*a* traverses the full width of ice bin 100. In such a configuration, two opposing ice agitator arms 110*b* would be utilized, to effectively scrape corners 101 on both sides of the ice storage bin. Such a configuration, therefore, would have a left side and a right side which would appear similar to the left side of FIG. 2, or which would appear similar to the right side of FIGS. 4 and 5, but appropriate mirror images of each other.

We claim:

1. An ice cube dispenser for compressed ice flakes, comprising:

an ice cube source;

an ice storage bin disposed adjacent said ice cube source, said ice storage bin having an arcuate bottom surface and at least two sides thereof, wherein arcuate contours are provided where said at least two sides join said arcuate bottom surface;

an agitator disposed within said ice storage bin, said agitator comprising a first ice agitator arm rotating on a shaft, said first ice agitator arm defining a radius when said shaft is rotated, said radius corresponding to a radius of said arcuate bottom surface and one of said arcuate contours of said ice storage bin, wherein said first agitator arm has a shape which corresponds to a shape of said one of said arcuate contours between one of said at least two sides and said arcuate bottom surface.

2. An ice cube dispenser as recited in claim 1, wherein said agitator comprises a second agitator arm thereupon, said agitator arm disposed on an opposite side of said shaft from said first agitator arm, said second agitator arm extending perpendicularly from a longitudinal axis of said shaft and having a bent portion which is bent outwardly toward an inner surface of one of said at least two sides, away from said first agitator arm, and toward another of said arcuate contoured portions.

3. An ice cube dispenser as recited in claim 2, further comprising a motor for rotating said shaft along a horizontal axis.

4. An ice cube dispenser as recited in claim 2, further comprising an ice dispenser port disposed on a surface of said ice storage bin, and including at least one ice movement blade for moving ice in said bin toward said ice dispenser port.

5. An ice cube dispenser as recited in claim 4, wherein said arcuate bottom surface of said storage bin includes a slot portion therein, said at least one ice movement blade being configured to sweep said slot portion upon a rotation of said shaft.

6. An ice cube dispenser as recited in claim 1, wherein said arcuate bottom surface includes a slot portion therein, said slot portion having an arcuate bottom surface thereof, said arcuate bottom surface of said bin being a first radial distance from said shaft, and said arcuate bottom surface of said slot portion being a second distance from said shaft, said second radial distance being greater than said first radial distance.

7. An ice cube dispenser as recited in claim 6, wherein said agitator includes at least one ice movement blade therein, said ice movement blade having a length which is greater than said first distance.

8. An ice cube dispenser as recited in claim 7, wherein said ice movement blade is perpendicularly attached to said shaft, and wherein said ice movement blade is configured to be received in said slot portion upon a rotational movement of said shaft.

9. An ice cube dispenser, comprising:

an ice storage bin having an arcuate bottom surface and at least two sides, said arcuate bottom surface comprising an arcuate section joining a first wall and a second wall, wherein said at least two sides are connected to said arcuate bottom surface and said at least two walls by arcuate contour sections;

an agitator disposed within said ice storage bin, said agitator comprising a first agitator arm rotating on a shaft, said first agitator arm defining a radius when said shaft is rotated, said radius corresponding to a radius of said arcuate bottom surface and at least one of said arcuate contours, wherein said first agitator arm has a shape which corresponds to a shape of said one of said arcuate contours.

10. An ice cube dispenser as recited in claim 9, further comprising a second agitator arm thereupon, said agitator arm disposed on an opposite side of said shaft from said first agitator arm and offset from an adjacent one of said side walls, said second agitator arm extending perpendicularly from a longitudinal axis of said shaft and including a bent portion which is bent outwardly toward said adjacent side, and toward another of said arcuate contoured portions.

11. An ice cube dispenser as recited in claim 10, further comprising a motor for rotating said agitator, said motor including a motor shaft extending into said ice bin and being connected to said shaft of said agitator.

12. An ice cube dispenser as recited in claim 9, wherein said arcuate bottom surface includes a slot portion therein, said slot portion extending from a first of said at least two walls to a second of said at least two walls and having an arcuate bottom surface thereof, said arcuate bottom surface of said bin being a first radial distance from said shaft, and said arcuate bottom surface of said slot portion being a second distance from said shaft, said second radial distance being greater than said first radial distance.

13. An ice cube dispenser as recited in claim 12, wherein said agitator includes at least one ice movement blade therein, said ice movement blade having a length which is greater than said first distance.

* * * * *